United States Patent
Furukawa et al.

(10) Patent No.: US 6,205,109 B1
(45) Date of Patent: Mar. 20, 2001

(54) SLED MOTOR MOUNTING STRUCTURE AND SLIDING FEED MECHANISM PROVIDED WITH THE SLED MOTOR MOUNTING STRUCTURE

(75) Inventors: Ken' ichi Furukawa, Kawasaki; Kouji Teranishi, Atsugi; Satoru Manabe, Chofu, all of (JP)

(73) Assignee: Mitsumi Electric Company, Tokyo (JP)

( * ) Notice: Subject to any disclaimer, the term of this patent is extended or adjusted under 35 U.S.C. 154(b) by 0 days.

(21) Appl. No.: 09/052,783

(22) Filed: Mar. 31, 1998

(51) Int. Cl.⁷ .................................................. G11B 17/30
(52) U.S. Cl. ............................................................ 369/219
(58) Field of Search .................................... 369/269, 223, 369/25.11, 215; 360/28.06

(56) References Cited

U.S. PATENT DOCUMENTS

| 5,357,500 | * | 10/1994 | Yanagisawa | 369/215 |
| 5,781,364 | * | 7/1998 | Hashimoto et al. | 360/78.05 |
| 6,052,358 | * | 4/2000 | Morikawa et al. | 359/219 |

FOREIGN PATENT DOCUMENTS

| 0 529 589A | 3/1993 | (EP) . |
| 2 142 410A | 1/1995 | (GB) . |

OTHER PUBLICATIONS

Patent Abstracts of Japan: Application No.: 61092480A, vol. 10, No. 266, May 10, 1986.
Patent Abstracts of Japan: Application No.: 62180569A, vol. 12, No. 029, Aug. 7, 1987.
Patent Abstracts of Japan: Application No.: 05250821A, vol. 18, No. 014, Sep. 28, 1993.
Patent Abstracts of Japan: Application No.: 09017134A, vol. 097, No. 005, Jan. 17, 1997.

* cited by examiner

Primary Examiner—David L. Ometz
Assistant Examiner—Tod Kupstag
(74) Attorney, Agent, or Firm—Patents+TMS P.C.

(57) ABSTRACT

A sled motor mounting structure is provided with a sled motor which having a rotation shaft and a lead screw which is mounted on the rotation shaft and is in mesh with a mated gear, the rotation shaft being constructed so as to have a play in its axial direction for enabling a smooth rotation; and a stopper provided in front of the tip of the rotation shaft of the sled motor such that the tip of the rotation shaft comes to abutment thereto when the rotation shaft is displaced toward the tip direction thereof within the play due to the rotation of the lead screw which is in mesh with the mated gear, thereby restricting the tip of the rotation shaft from further movement in the axial direction thereof. The stopper is arranged at a prescribed distance from the tip of the rotation shaft when the rotation shaft is moved to the base end within the play. The prescribed distance is set to be less than the play in the axial direction, for example it lies within the range of 0.02 mm–0.05 mm. According to this structure, because there is no resistance exerted on the rotation shaft by a plate spring or the like which is used in the prior art to push a rotation shaft toward the base end, it is possible to smoothly rotate the sled motor without the need for a large torque.

6 Claims, 10 Drawing Sheets

SLED MOTOR MOUNTING STRUCTURE AND SLIDING FEED MECHANISM PROVIDED WITH THE SLED MOTOR MOUNTING STRUCTURE

BACKGROUND OF THE INVENTION

1. Field of the Invention

The present invention relates to a sled motor mounting structure and a sliding feed mechanism provided with the sled motor mounting structure, and in particular relates to a sled motor mounting structure and a sliding feed mechanism provided with the sled motor mounting structure, for example, to be used in CD-ROM drives and CD-R (CD-Recordable) drives.

2. Description of the Prior Art

Disc drives, such as CD-ROM drives and CD-R drives or the like, use a sliding feed mechanism to move an optical pick-up and the like in the radial direction of a disc. This sliding feed mechanism is generally constructed from a slider (carriage) guided in a freely slidable manner on a guide load, a rack gear mounted on the slider, a reduction gear which meshes with the rack gear, and a reversible DC motor which includes a rotation shaft and a gear mounted to the rotation shaft to mesh with the reduction gear. In order to miniaturize the reduction mechanism and reduce noise, a motor (hereafter referred to as the "sled motor") which includes a rotation shaft and a lead screw (worm) mounted on the rotation shaft is generally used as the DC motor. In this arrangement, the slider on which the optical pick-up and the like are provided is moved forward and backward in the radial direction of a disc by driving the sled motor in the forward and reverse directions.

In this connection, in a motor which is used as the sled motor described above, the rotation shaft of the motor is provided with a small play in the axial direction to enable smooth rotation of the motor, and as a result the rotation shaft is capable of a small degree of movement in the axial direction of the rotation shaft. Consequently, when the rotation shaft of the motor is rotated in the advancing direction (screw tightening direction) of the lead screw, the rotation shaft moves in the tip direction within the range of the play, and this causes a collar and a thrust washer to come into contact with the bearing of the motor, whereby the rotation load of the motor is increased.

To prevent such increase in the rotation load of the motor, in such prior art sled motor mounting structures and sliding feed mechanisms provided with the sled motor mounting structure, the tip of the rotation shaft of the motor is biased by a spring or the like toward the base end so as to resist any movement of the rotation shaft of the motor toward the tip direction as the lead screw rotates.

However, if the rotation shaft of the motor is biased in this way by a spring or the like, a resistance exerted to the rotation shaft increases during rotation due to the biasing force added thereto, thus making it necessary for the motor to supply a large torque. Consequently, a relatively large size motor capable of delivering a large torque greater than the originally required torque must be used for the sled motor provided in the prior art sliding feed mechanism. Further, in a method like that described above in which the rotation shaft is biased by a spring, there is a slight difference in the biasing force exerted on the rotation shaft depending on the direction of rotation, and this will result in uneven rotation.

In particular, in a CD-R drive, because a highly accurate writing characteristic is required to carry out data recording, it is necessary to accurately position the objective lens of the optical pick-up at the center of the actuator when writing in data, but if the sliding feed mechanism does not move smoothly, the objective lens of the optical pick-up will move or swing, thereby degrading the writing characteristics.

SUMMARY OF THE INVENTION

With a view toward overcoming the problems associated with the sled motor of the prior art slide mechanism described above, it is an object of the present invention to reduce the load of the sled motor and make it possible to use a small size sled motor.

In order to achieve the object stated above, the sled motor mounting structure according to the present invention is provided with a sled motor having a rotation shaft with a tip and a lead screw which is mounted on the rotation shaft and is in mesh with a mated gear, the rotation shaft being constructed so as to have a play in its axial direction for enabling a smooth rotation; and rotation shaft movement restricting means provided in front of the tip of the rotation shaft of the sled motor such that the tip of the rotation shaft comes to abutment thereto when the rotation shaft is displaced toward the tip direction thereof within the play due to the rotation of the lead screw which is in mesh with the mated gear, thereby restricting the tip of the rotation shaft from further movement in the axial direction thereof.

In the sled motor mounting structure which has the above-described structure according to the present invention, the rotation shaft movement restricting means makes it possible to restrict movement of the rotation shaft over a prescribed distance even in the case where the rotation shaft moves in the tip direction within the play. Accordingly, it is possible to prevent the collar and thrust washer inside the motor from coming into contact with the motor bearing, and this in turn makes it possible to prevent the rotation load of the motor from increasing.

Preferably, the rotation shaft movement restricting means is formed from a stopper arranged at a prescribed distance from the tip of the rotation shaft when the rotation shaft of the sled motor is moved to the base side within the play in the axial direction. In this case, the prescribed distance is set to be less than or equal to the play in the axial direction, preferably in the range 0.02 mm~0.05 mm. Further, the rotation shaft movement restricting means preferably includes a reinforcing means.

Another aspect of the present invention is directed to a sliding feed mechanism, comprising:

a sled motor having a rotation shaft with a tip and a lead screw mounted on the rotation shaft, the rotation shaft being constructed so as to have a play in its axial direction for enabling a smooth rotation;

a speed reduction gear mechanism which includes a mated gear in mesh with the lead screw;

a driven means which is driven through the speed reduction gear mechanism; and rotation shaft movement restricting means provided in front of the tip of the rotation shaft of the sled motor such that the tip of the rotation shaft comes to abut thereto when the rotation shaft is displaced toward the tip direction thereof within the play due to the rotation of the lead screw which is in mesh with the mated gear, thereby restricting the tip of the rotation shaft from further movement in the axial direction thereof.

Preferably, the rotation shaft movement restricting means includes a stopper which is arranged at a distance of from 0.02 to 0.05 mm from the tip of the rotation shaft when the rotation shaft of the sled motor is moved to the base end within the play in the axial direction.

Other objects, structures and advantages of the present invention will be apparent when the following description of the preferred embodiment is considered taken in conjunction with the accompanying drawings.

DETAILED DESCRIPTION OF THE PREFERRED EMBODIMENTS

A detailed description of the preferred embodiments of a sled motor mounting structure and sliding feed mechanism provided with the sled motor mounting structure according to the present invention will now be given below with reference to the appended drawings. In the following, a description is made with regard to an embodiment of a sliding feed mechanism used in a CD-R drive, the present invention is not. limited to CD-R drive.

Figure 1:
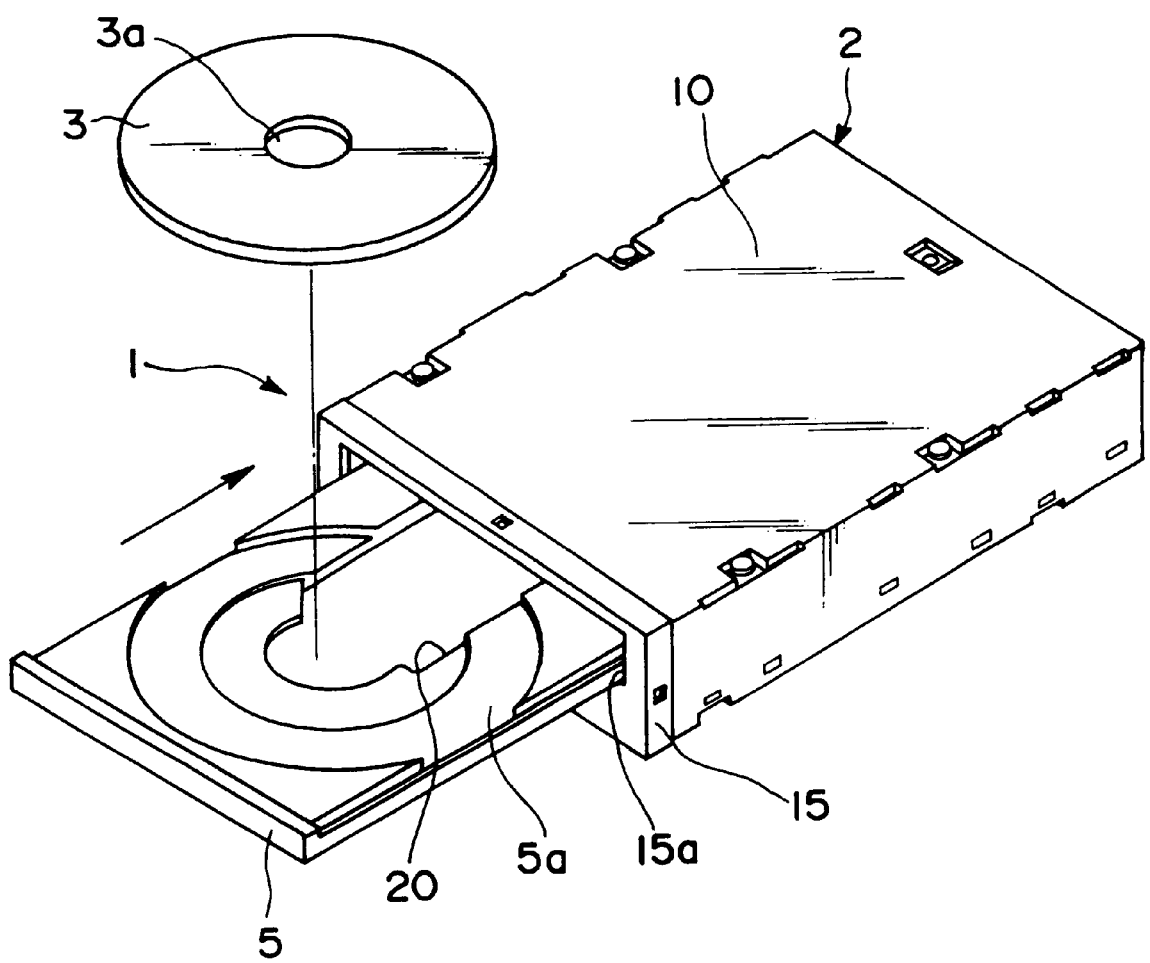
FIG. 1 is a perspective view of a disc drive to which a sled motor mounting structure and a sliding feed mechanism provided with the sled motor mounting structure of an embodiment according to the present invention.

FIG. 1 is a perspective view of a disc drive 1A to which a sled motor mounting structure and sliding feed mechanism provided with the sled motor mounting structure of an embodiment according to the present invention. The disc drive 1A shown in FIG. 1 is configured into a CD-R drive for playing back or recording and playing back an optical disc 3. The disc drive 1A is roughly constructed from a main body 2 and a disc tray 5 which is movable in the forward and backward direction (horizontal direction) with respect to the main body 2 for transporting the optical disc 3.

The main body 2 includes a circuit substrate assembly (not shown in the drawings) and a mechanism assembly 13 arranged on the circuit substrate assembly, and they are housed within a casing 10.

The casing 10 is comprised of thin metal plates, and at the front portion of the casing 10, there is mounted a front panel 15 having an opening 15a.

Figure 2:
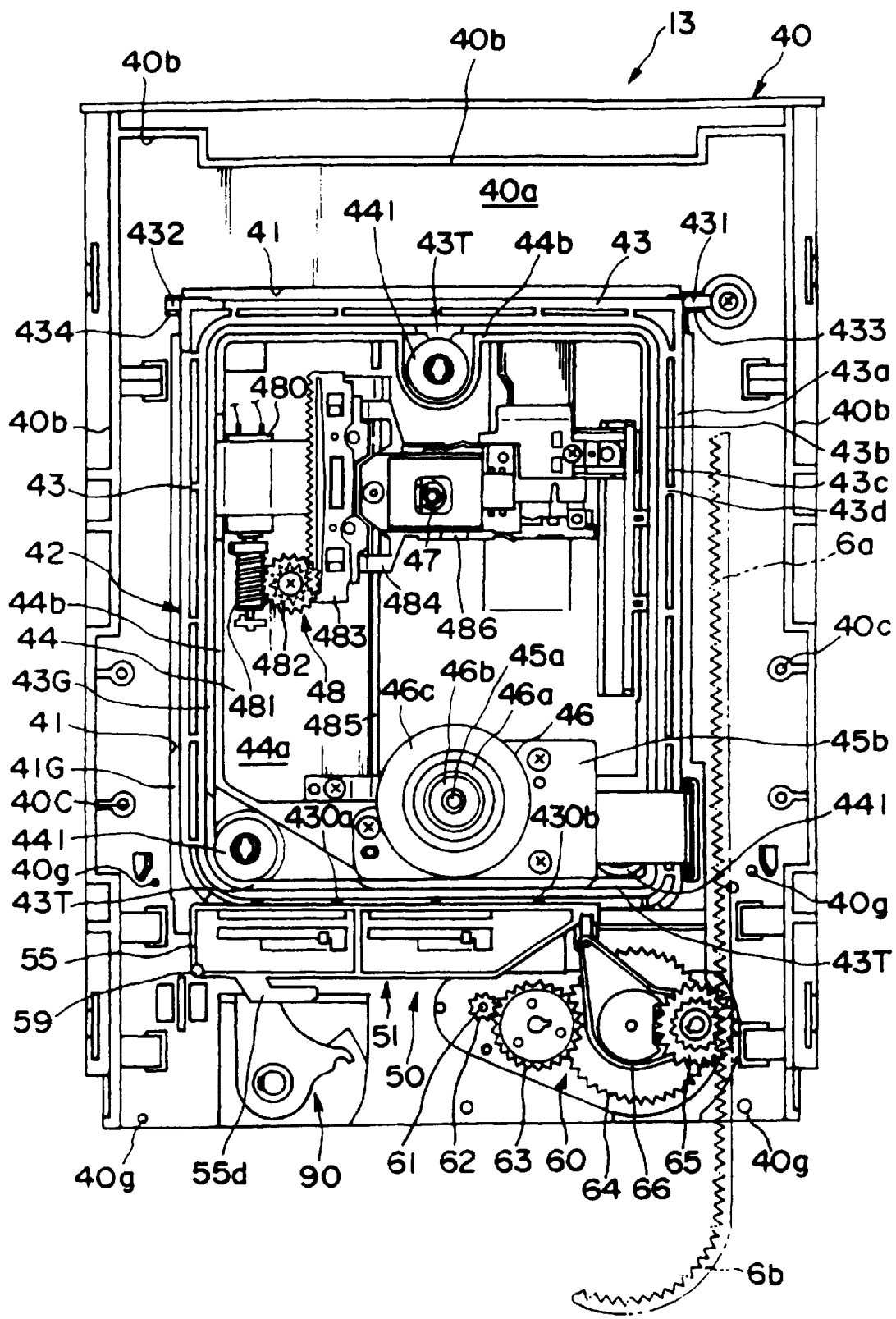
FIG. 2 is a planar view of a main body of the disc drive shown in FIG. 1, in which a mechanism unit is shown in a lowered position.
Figure 3:
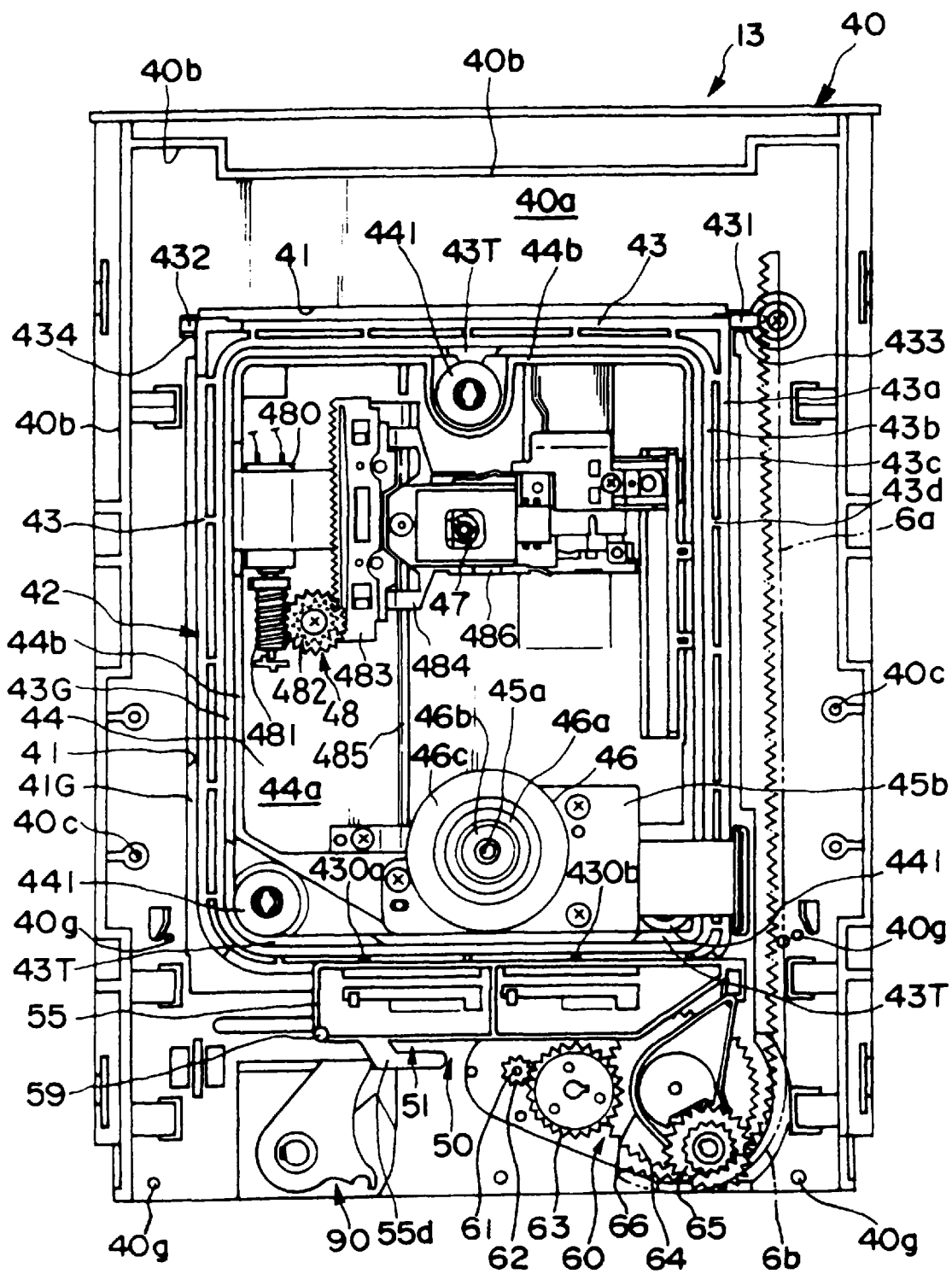
FIG. 3 is another planar view of the main body of the disc drive shown in FIG. 1, in which the mechanism unit is shown in a raised position.

FIG. 2 is a planar view of a main body 2 of the disc drive from which a casing is removed, which shows a state in which a mechanism unit is in a lowered position (lower position), and FIG. 3 is another planar view of the main body 2, which shows a state in which the mechanism unit is in a raised position (upper position).

As shown in FIGS. 2 and 3, the mechanism assembly 13 housed in the casing 10 is provided with a chassis 40 which is preferably constructed from a hard resin. The chassis 40 is constructed from a roughly rectangular-shaped bottom portion 40a and a U-shaped wall portion 40b which stands erect along the left, right and back edge portions of the bottom portion 40a.

In this way, no wall portion is formed in the front of the chassis 40 such that the front of the chassis is open. Further, when the mechanism assembly 13 is assembled into the casing 10, the open front portion of the chassis 40 is aligned with the opening 15a of the front panel 15 attached to the casing 10 so that the disc tray 5 can be moved into and out of the main body 2 through the opening 15a.

As shown in FIG. 1, the disc tray 5 is provided with a shallow concave disc supporting portion 5a. The optical disc 3 is placed in the disc supporting portion Sa, and then transported to a disc loaded position (disc playback position) under the condition that the optical disc 3 is placed in a prescribed position. Further, in the disc tray 5, there is formed a substantially rectangular shape opening 20 which extends from the roughly central portion of the disc supporting portion 5a of the disc tray 5 toward the rear portion thereof such that a turn table described hereinbelow can be raised through this opening and an optical scanning can be carried out by the optical pick-up through this opening 20.

Figure 4:
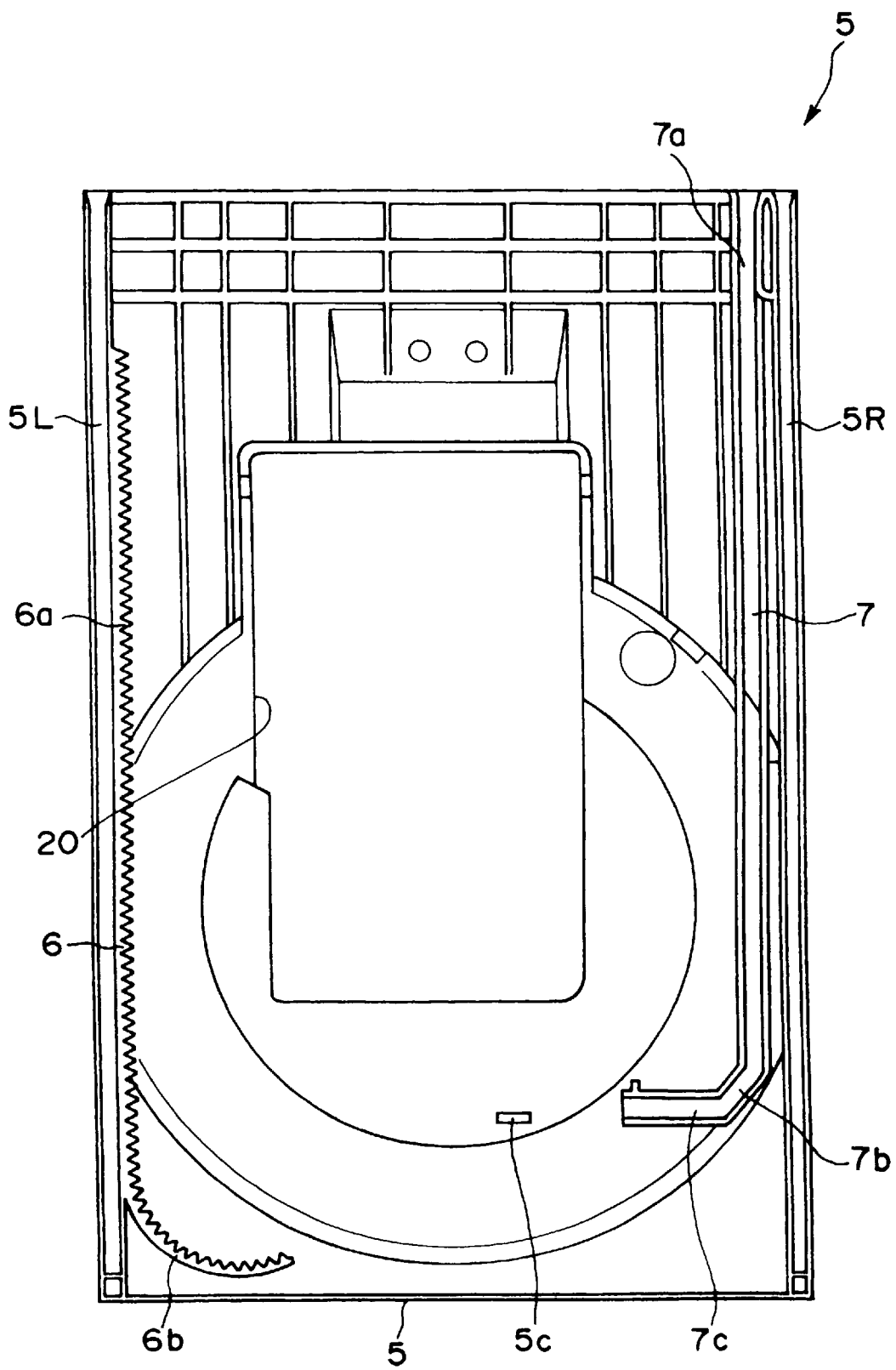
FIG. 4 is a bottom view of the construction of the underside of a disc tray of the disc drive shown in FIG. 1.

As shown in FIG. 4, on the left and right portions of the underside surface of the disc tray 5, there are formed guide grooves 5L, 5R so as to extend in a longitudinal direction (forward and backward direction) of the disc tray 5. These guide grooves 5L and 5R are adapted to slidably engage with protruding guide members 40g (see FIGS. 2 and 3) formed on the left and right side portions of the bottom portion 40a of the chassis 40.

Further, the underside surface of the disc tray 5 is further provided with a rack gear 6 which includes a first rack 6a which extends in a straight line in the forward and backward direction along the guide groove 5L and a roughly 90 degree arc-shaped second rack 6b which is formed at the front end portion (the front side of the disc tray 5, as shown in the lower portion of FIG. 4) of the first rack 6a so as to be continuous therewith.

Furthermore, as shown in FIG. 4, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

In this regard, it is to be noted that a rib (protrusion) indicated by the reference numeral 5c in the drawing is a member that is adapted to engage with a disc tray locking portion 55d formed in a cam member 55 (described below) for restricting the horizontal movement (forward and backward direction) of the disc tray 5.

Further, as shown in FIGS. 2 and 3, the chassis 40 is provided with a mechanism unit 42 equipped with a turntable 46 for rotating the optical disc 3 and an optical pick-up 47 for playing back or recording and playing back the disc 3 and others.

The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 3) in which the disc 3 is supported on the turntable 46 and a lowered position (lower position; FIG. 2) which is lower than the raised position.

In particular, as shown in FIGS. 2 and 3, the mechanism unit 42 includes a base frame 43 constructed preferably from a hard resin, and a support member (support plate) 44 which is supported on the base frame 43 via elastic members (insulators) 441.

The base frame 43 is formed so as to have a roughly rectangular shape which includes a front portion and a rear portion. In more detail, the base frame 43 comprises a substantially rectangular outer frame 43a and a substantially rectangular inner frame 43b arranged inside the outer frame 43a. The inner frame 43b is one size smaller than the outer frame 43a so as to define a space therearound and its corner portions are formed into an arched shape, respectively. Further, between the outer and inner frames 43a, 43b there is formed a horizontal connecting portion 43c which connects these frames integrally at a position roughly the middle of their height. Furthermore, a plurality of reinforcing vertical ribs are integrally formed on the connecting portion 43c through a predetermined spacing so as to connect the outer and inner frames 43a, 43b integrally. With this result, the base frame 43 is constructed into a so called rudder frame in which the reinforcing vertical ribs 43d are formed on the horizontal connecting portion 43c through a prescribed spacing around the inner frame 43b.

This base frame 43 is formed by injection molding. In this case, if the base frame 43 is formed from a usual mold body made of a hard resin and having a certain thickness, there is a case that deformation would occur when it is cooled after injection molding. However, if the base fram3 43 is formed in the form of the rudder frame described above, it is possible to avoid such deformation from occurring and this means that it becomes possible to provide a light base frame having a high strength by injection molding.

Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner wall portions of the chassis 40 defining the opening 41. By supporting the rear portion of the mechanism unit 42 with the axles 431, 432 in this way, the front portion of the mechanism unit 42 is able to move with respect to the chassis 40 between the lowered position shown in FIG. 2 and the raised position shown In FIG. 3 when the mechanism unit 42 (base frame 43) is rotated around the axles 431, 432.

Figure 9:
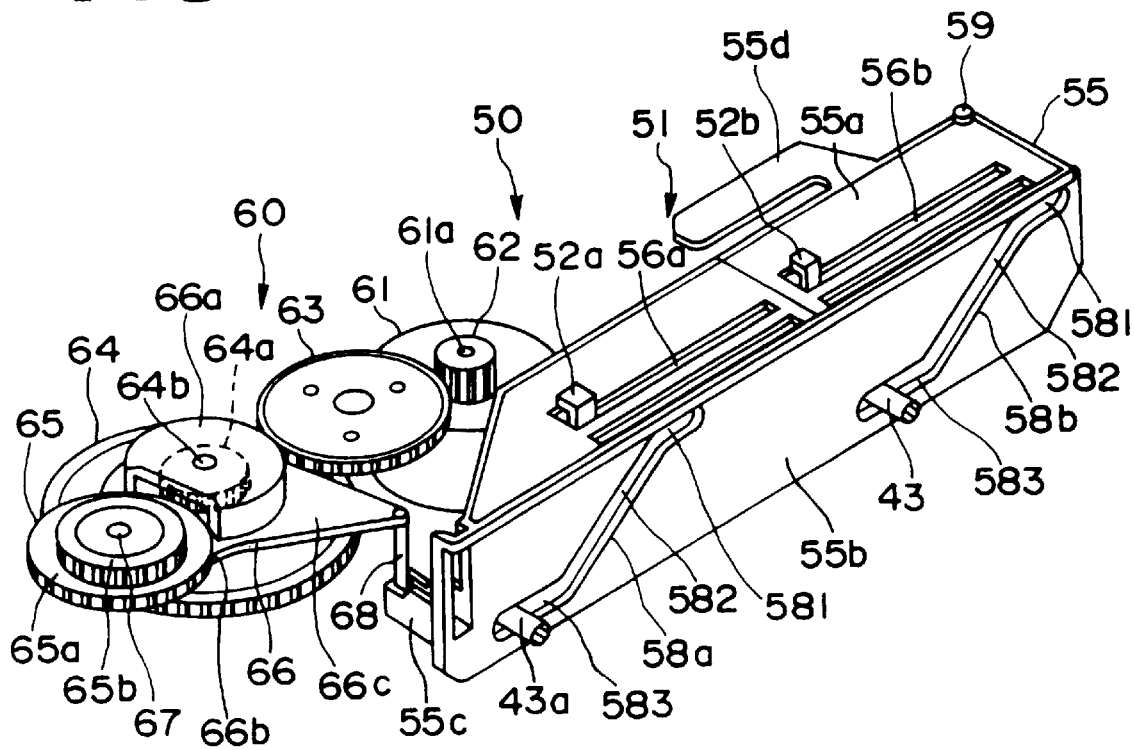
FIG. 9 is a perspective view which shows the structure of a cam member used in the disc drive shown in FIG. 1, in which the cam member is shown in a first position.
Figure 10:
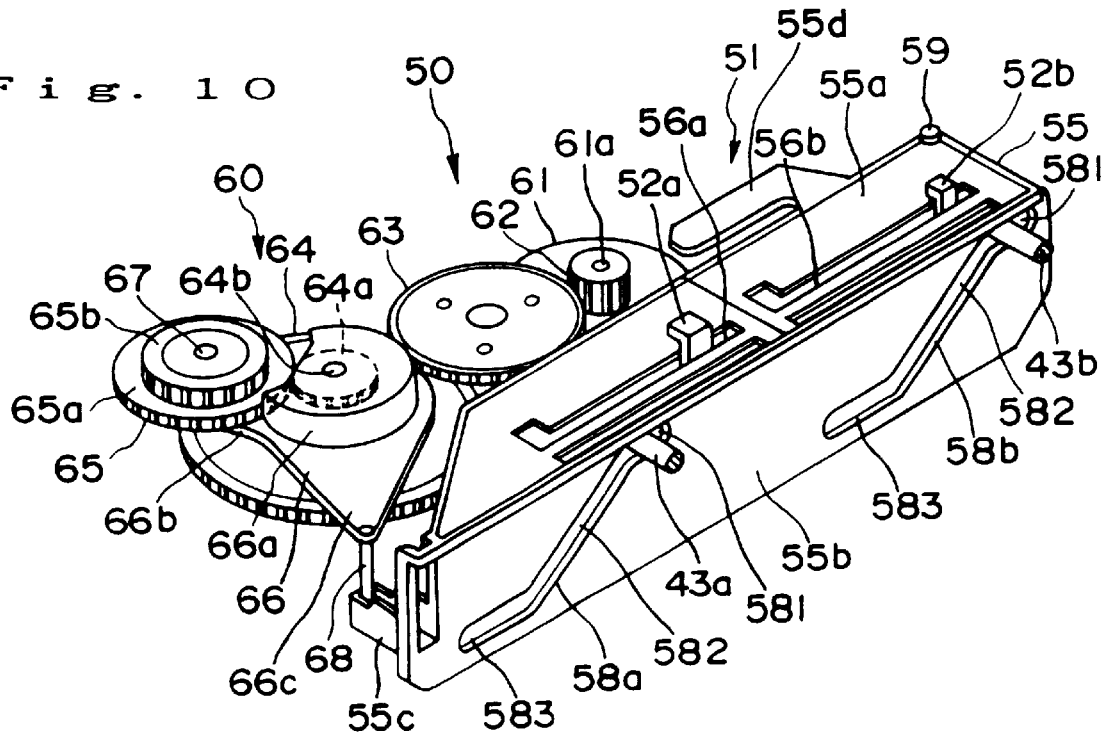
FIG. 10 is a perspective view which shows the structure of the cam member used in the disc drive shown in FIG. 1, in which the cam member is shown in a second position.

Further, a pair of protruding guide pins 430a, 430b are formed on the front of the base frame 43 (See FIGS. 9 and 10). These guide pins 430a, 430b pass through respectively a pair of guide slots (not shown in the drawings) formed in the wall portion of the front portion of the chassis 40 which defines the opening 41 of the chassis 40, and then engage respectively with cam grooves 58a, 58b of the cam member 55 of the cam mechanism 51 described hereinbelow. This enables the front portion of the base frame 43 to be guided up or down in accordance with the displacement of the cam member 55.

Taking possible deformation (thermal deformation or the like) of the chassis 40 into account, a prescribed peripheral spacing 41G is provided between the base frame 43 and wall portions of the chassis 40. Specifically, this spacing 41G is provided around roughly the entire circumference of the base frame 43. In this way, the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the inner frame 43b of the base frame 43 such that the wall portion 44b is arranged inside the inner frame 43b of the base frame 43 via a prescribed spacing 43G. The support member 44 is supported by the base frame 43 via the elastic members (insulators) 441 provided on tabs 43T formed at the left and right corner portions of the front side of the inner frame 43b of the base frame 43 and on a tab 43T at roughly the middle of the rear portion of the inner frame 43b of the base frame 43. Namely, the support member 44 is supported by the base frame 43 via the elastic members 441 provided at three points which roughly form an isosceles triangle.

Figure 5:
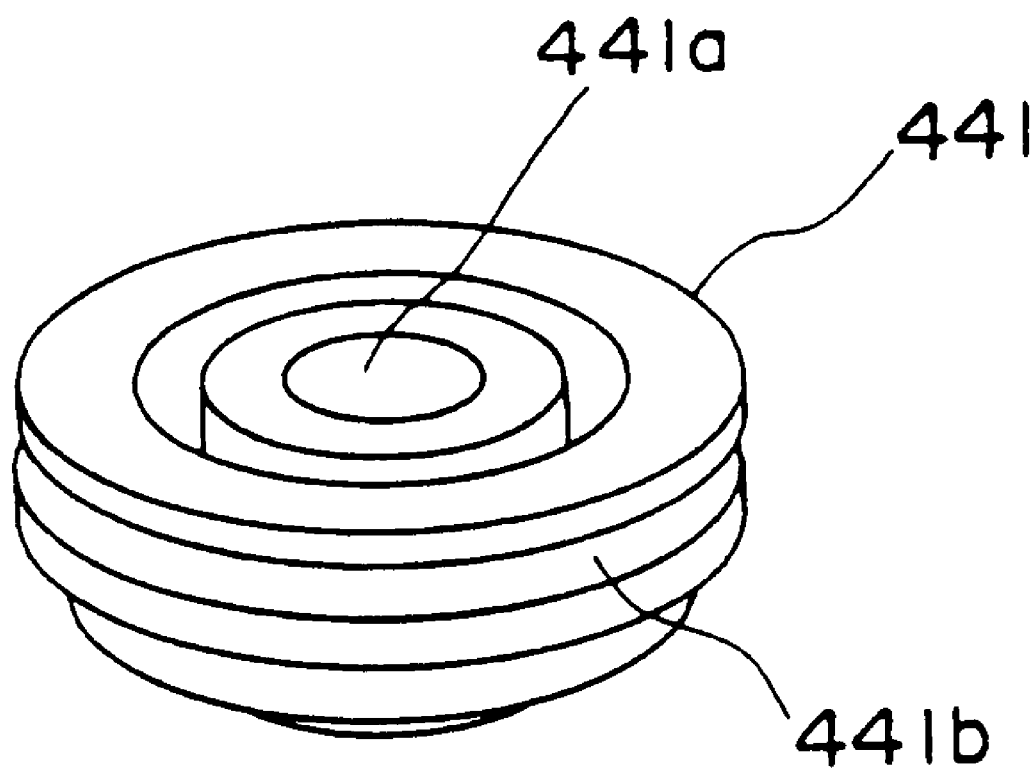
FIG. 5 is a perspective view showing the structure of an elastic member used in the disc drive shown in FIG. 1.

As shown in FIG. 5, each of the elastic members 441, which is formed from an elastic material such as rubber or the like, has a roughly cylindrical shape including a center hole 441a axially formed. On the outer circumferantial surface, there is formed a circumferantial groove 441b. When the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44.

Further, as shown in FIGS. 2 and 3, the support member 44 is provided with a spindle motor (not shown in the drawings) for rotating an optical disc 3, a turntable 46 fixed to the rotation shaft 45a of the spindle motor, an optical pick-up 47, and an optical pick-up moving mechanism 48 for moving the optical pick-up 47 in the radial direction of the optical disc 3. The spindle motor is mounted to a motor support 45b which is made of a metal plate fixed to the support member 44. The spindle motor is capable of rotating the optical disc 3 at a high rotational speed, for example, capable of rotating the optical disc 3 at a speed of 200–6400 rpm. Further, the optical pick-up 47 includes an objective lens 47a and an actuator (not shown in the drawings).

The turntable 46 is a disc-shaped member which includes a protruding ring-shaped center hub 46a formed in the center portion of the turntable 46. This center hub 46a is adapted to fit into a center hole 3a of the optical disc 3. The center hub 46a is formed so as to taper from the tip to the base in order to prevent the optical disc 3 from slipping off center when placed on the turntable 46. Further, inside the center hub 46a, there is provided a spring (not shown) which allows the center hub 46a to bemovedupanddown. Furthermore,aring-shapedpermanentmagnet 46b for creating an attraction force on a disc damper (described below) is provided in the turn table 46 at a position between the center hub 46a and the rotation shaft 45a of the spindle motor.

Further, a ring-shaped pad 46c is bonded to the upper part of the turntable 46 (i.e., the side used to support the optical disc 3) around the circumference of the center hub 46a. The pad 46c is made from an elastic material having a relatively high coefficient of friction so as to exhibit a function that prevents the optical disc 3 from slipping. Examples of such a material include various rubbers, soft resins or porous materials (sponges) or the like.

The optical pick-up 47 is a flat type optical pick-up constructed so as to deflect light reflected from the optical disc 3 by roughly 90 degrees using a mirror (or prism) or the like to guide such light toward a light gathering element such as a photodiode or the like.

Figure 6:
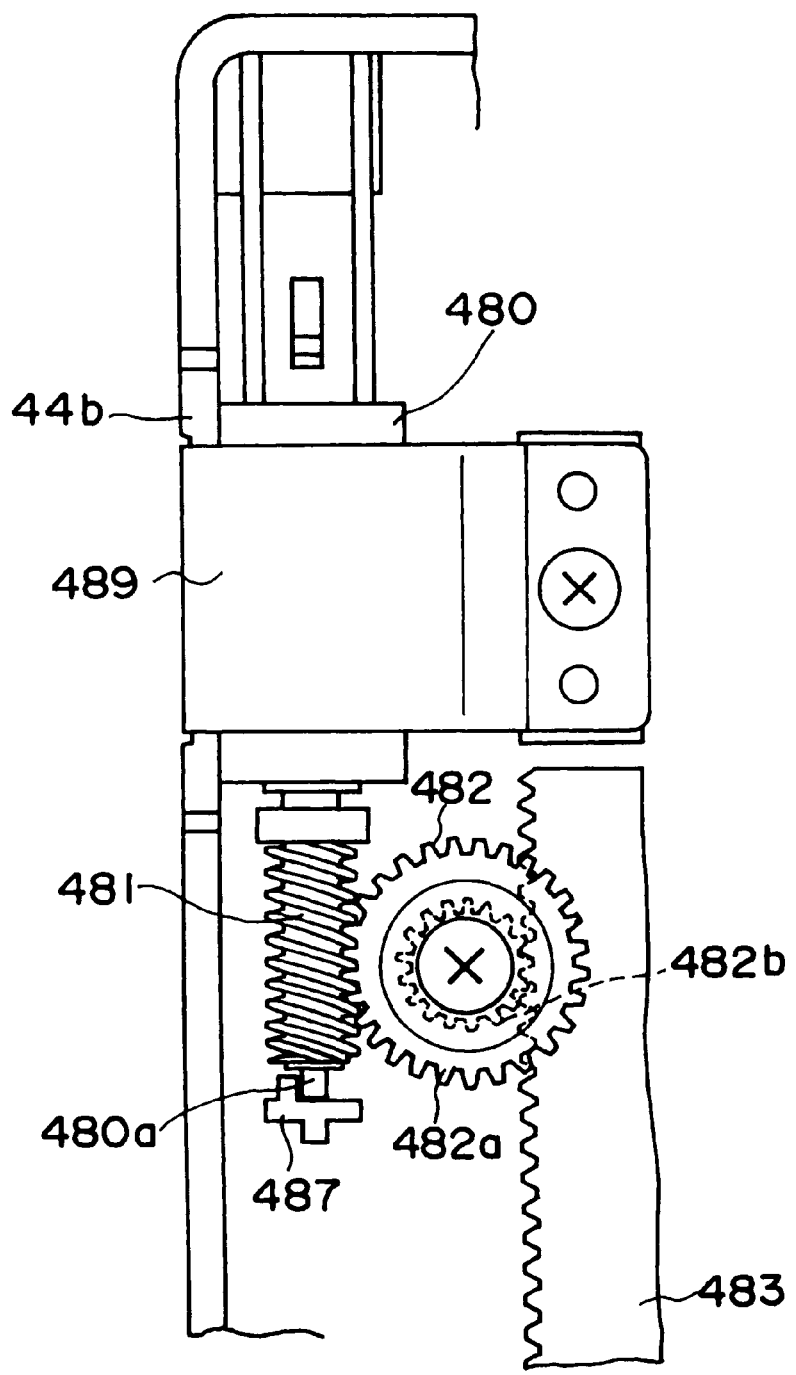
FIG. 6 is an planner view which shows a structure of a sliding feed mechanism (optical pick-up displacing mechanism) of the disc drive shown in FIG. 1.

As shown in FIGS. 2, 3 and 6, the optical pick-up moving mechanism 48 constructed in the form of a sliding feed mechanism is constructed from a motor 480 capable of forward/reverse rotation, a lead screw (worm gear) 481 which is fixed on a rotation shaft 480a of the motor 480 and rotated by the motor 480, a reduction gear 482 which meshes with the lead screw 481, a rack gear 483 which meshes with the reduction gear 482, a slider 484 which is fixed to the rack gear 483, a guide rod 485 which regulates the direction of movement of the slider 484, and a head support (pick-up base) 486 which is integrally formed with the slider 484, with the head support 486 being provided with the optical pick-up 47. Further, the lead screw 481 and the guide rod 485 are arranged so that their lengthwise directions are directed roughly parallel to the forward and backward direction of the disc drive 1A.

As shown in FIG. 6, the reduction gear 482 Is constructed from a large-diameter worm wheel 482a which meshes with the lead screw 481 fixed on the rotational shaft 480a of the sled motor 480 and small-diameter pinion gear 482b which is integrally formed with the under surface of the worm wheel 482a so as to be coaxially therewith and which meshes with the rack gear 483. A combimation of the lead screw 481, worm wheel 482a, pinion gear 482b and rack gear 483 constitutes a rotational speed reduction mechanism of the optical pick-up moving mechanism (sliding feed mechanism).

Meanwhile, the rotational shaft 480a of the sled motor 480 is provided with a small play in its axial direction in order to enable smooth rotation, so that the rotational shaft 480a can be slightly displaced within the play in the axial direction thereof. Therefore, when the lead screw 481 of the sled motor 480 is rotated in the anti-clockwise direction (which moves the optical pick-up toward the outer side of the optical disc) viewed from the tip side of the rotational shaft, the rotational shaft 480a of the sled motor 480 is pulled and slightly displaced toward the tip end thereof within the play due to the rotation of the lead screw 481.

In this embodiment, in order to minimize the axial displacement of the rotational shaft 480a of the motor 480 within the play which is caused by the rotation of the lead screw 481, there is provided a means 487 for restricting displacement of the rotational shaft (rotational shaft displacement restricting means). This rotational shaft displacement restricting means 487 is provided in front of the tip of the rotational shaft 480a so that the tip of the rotational shaft 480a is abutted thereto to restrict further axial displacement of the rotational shaft 480a when the rotational shaft 480a is axially displaced toward the tip side thereof.

The rotational shaft displacement restricting means 487 is constructed from a stopper member 487 which is positioned through a prescribed distance "d" from the tip of the rotational shaft 480a under the condition that the rotational shaft 480a is in the base end thereof within the play. This stopper member 487 is integrally formed with the bottom portion 44a of the support member 44 so as to protrude therefrom such that the tip of the rotational shaft 480a becomes abutted thereto when the rotational shaft 480a is displaced toward tip end due to the rotation of the lead screw 481.

For this purpose, the prescribed distance "d" is determined to be a size less than the play of the rotational shaft 480a. For example, in the case of a small-size motor such as one used in the optical pick-up moving mechanism of the CD-R drive, the prescribed distance "d" is set to lie within the range of from 0.02 mm to 0.05 mm. When the size of the motor is different, the degree of the play of the rotation shaft in the axial direction also differs, so that it is possible to change the prescribed distance "d" a propriatery depending on the motor to be used.

Since the stopper member 487 is pushed when the tip of the rotational shaft 480a is abutted thereto, it is preferred that a reinforcing means is further provided to increase its strength. For example, as shown in FIG. 7B it is possible to form a reinforcing rib 487a as a reinforcing member on the rear surface (a surface which does not face the rotational shaft) of the stopper member 487 integrally. This reinforcing rib 487b is provided at a position of the front surface where the rotational shaft 480a of the sled motor 480 is not abutted.

Figure 8:
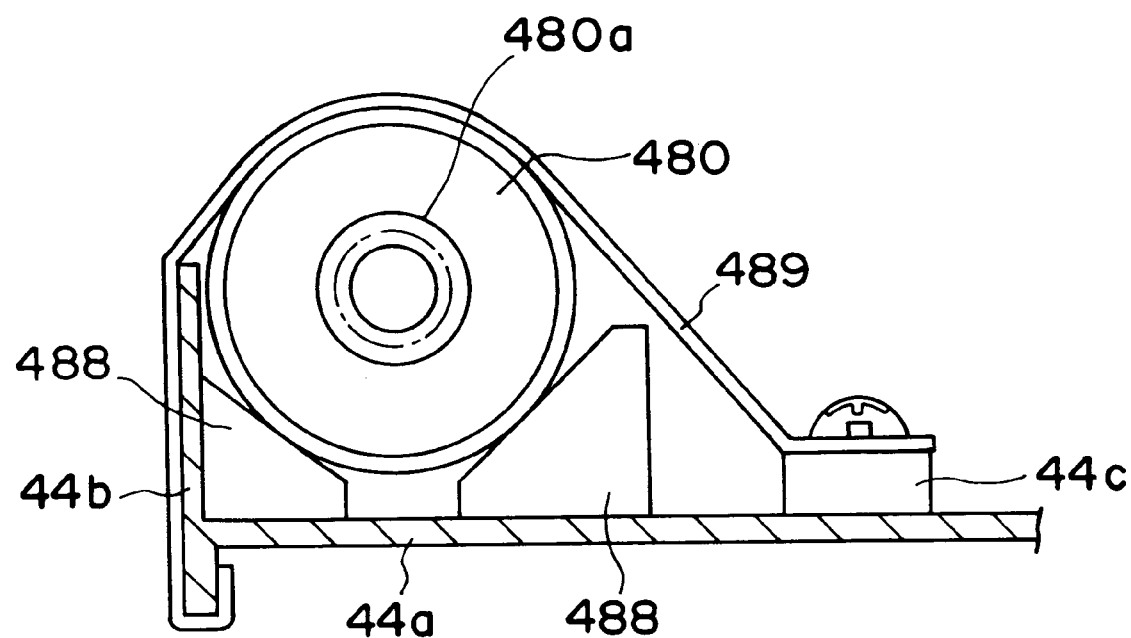
FIG. 8 is a sectional view which shows the mounting structure of the sled motor used in the disc drive shown in FIG. 1.

As shown in FIG. 8, the sled motor 480 is placed on a pair of supporting members 488 which are integrally formed with the bottom portion 44a of the support member 44. Each of the supporting members is constructed from two pieces arranged so as to form a V-shaped supporting surface. Further, the sled motor 480 is mounted onto the supporting members 488 by holding the upper portion of the motor with a retaining plate 489 which is formed from a metal plate or the like. Specifically, one end of the retaining plate 489 is bent along the side wall 44b, and its tip portion is formed into a C-shaped hook which is engaged with the lower edge of the side wall 44b. On the other hand, the other end of the retaining plate 489 is mounted onto a mounting portion 44c formed on the bottom portion 44a by means of a boss (or screw, rivet) or the like.

When the sled motor 480 is mounted onto the supporting members 488, first the sled motor 480 is positioned onto the supporting members under the condition that a thin metal plate or the like having a prescribed thickness is interposed between the tip of the rotational shaft 480a of the sled motor 480 and the stopper member 487. As described above, the thickness of the metal plate is less than the play, for example 0.02 mm to 0.05 mm. Next, the sled motor 480 is secured onto the supporting members using the retaining plate 489 described above, and then the metal plate which has been interposed between the tip of the rotational shaft 480a and the stopper member 487 is removed therefrom. In this way, it is possible to precisely set the distance between the tip of the rotational shaft 480a and the stopper member 487 so as to be the prescribed distance "d".

In this embodiment, the sled motor 480, the spindle motor and the loading motor 61 (described hereinafter in detail) are controlled by a controlling means (CPU) provided on the circuit substrate assembly (not shown in the drawings).

In this case, in order to drive the motor with a small voltage at the start of the rotation, it is preferred that the sled motor 480 is controlled such that its rotational shaft 480*a* is being slightly oscillated by applying high and low pulses to the coil in a predetermined interval. - In this way, it is not necessary to apply a large voltage to the motor at the start of the rotation. This is particularly suited for the case where a fine feed of the optical pick-up 47 is required during writing or reading operation being carried out. In the case of the small-sized motor like the sled motor used in the optical pick-up moving mechanism of the CD-R drive in accordance with this embodiment, a pulse voltage of 40 Hz can be applied, for example.

As shown in FIG. 2 and FIG. 3, in front of the mechanism unit 42, there is provided a loading mechanism 50 for displacing the mechanism unit 42 between the lowered position (FIG. 2) and the raised position (FIG. 3) and for moving the disc tray 5 between the loading position and the eject position. This loading mechanism 50 comprises a cam mechanism 51 which is operatively coupled with the mechanism unit 42 and can be moved between a first position (FIG. 2) and a second position (FIG. 3) and a driving mechanism 60 for driving the disc tray 5 and the con mechanism The cam mechanism 51 can be operated to move the mechanism unit 42 to either the lowered position when the cam mechanism 51 is in the first position shown in FIG. 2, or the raised position when the cam mechanism 51 is in the second position shown in FIG. 3. In more details, as shown in FIGS. 9 and 10, the cam mechanism 51 includes a cam member 55 arranged so as to be slidable between a first position (FIG. 9) and a second position (FIG. 10) in the sideways direction with respect to the chassis 40 (i.e., the direction orthogonal to the direction of movement of the disc tray 5). The cam member 55 is generally constructed from a roughly plate-shaped horizontal portion 55*a* and a plate-shaped vertical portion 55*b* which is integrally formed on the underside surface the horizontal portion 55*a* at a position close to the rear edge (at the side of the mechanism unit) so as to be perpendicular to the horizontal portion. That is, the cam member 55 is formed from a member having a roughly T-shaped cross section. This structure can prevent camber from being produced upon cooling process in the injection molding of resin materials.

Formed on the horizontal portion 55*a* of the cam member 55 are sideways guide grooves 56*a*, 56*b* which engage respectively with a pair of protrusions 52*a*, 52*b* which protrude from the top of the front portion of the chassis 40. These guide grooves 56*a*, 56*b* are used to guide the cam member 55 between the first and second positions. Further, the underside surface of the horizontal portion 55*a* is provided with an engaging pin (not shown in the drawings) which is inserted into an elongated slot formed in the top of the front portion of the chassis 40. This engaging pin is adapted to interlock with an emergency eject mechanism 90 (described below).

Further, on the horizontal portion 55*a* of the cam member 55, there is formed a disc tray locking portion 55*d* which is engaged with the rib 5*c* formed on the rear surface of the disc tray 5 when the cam member 55 is displaced from the first position to the second position to restrict the movement of the disc tray 5.

The vertical portion 55*b* of the cam member 55 is positioned to face the front wall which defines the opening 41 of the chassis 40. Formed in the vertical portion 55*b* are a pair of cam grooves 58*a*, 58*b* each having the same shape. Each of the cam grooves 58*a*, 58*b* is constructed from a horizontally extending upper groove 581 and lower groove 583 and a slanting groove 582 which connects the upper groove 581 and lower groove 583.

Further, the guide pins (following members) 430*a*, 430*b* which are provided on the front surface of the base frame 43 of the mechanism unit 42 as described above are inserted into the cam grooves 58*a*, 58*b*, respectively. In this way, when the cam member 55 is moved between the first position and the second position, the guide pins 430*a*, 430*b* are moved by the slide abutment with the cam grooves 58*a*, 58*b* in the up and down direction.

Namely, when the cam member 55 is positioned at the first position, the guide pins 430*a*, 430*b* are engaged with the lower grooves 583 (FIG. 9), and the front portion of the mechanism unit 42 is in the lowered position shown in FIG. 2. When the cam member 55 is moved from the first position to the second position, the guide pins 430*a*, 430*b* are moved up by the slanting grooves 582, thereby causing the front portion of the mechanism unit 42 to move from the lowered position toward the raised position. Then, when the cam member 55 reaches the second position, the guide pins 430*a*, 430*b* engage with the upper grooves 581 (FIG. 10), and the front portion of the mechanism unit 42 is displaced to the raised position shown in FIG. 3. In this connection, it is to be noted that when the cam member 55 is displaced to the second position, the disc tray locking portion 55*d* formed on the horizontal portion 55*a* of the cam member 55 is engaged with the rib 5*c* formed on the underside surface of the disc tray 5 as described above, thereby the disc tray 5 is restricted to move further, that is the disc tray 5 being locked up.

Further, a protrusion 59 is integrally formed on an end portion of the horizontal portion 55*a* of the cam member 55 to engage with the cam member movement restricting groove 7 formed in the underside surface of the disc tray 5. As a result, when the protrusion 59 is engaged with the first movement restricting groove 7*a* of the disc tray 5, the cam member 55 is prevented from moving in the sideways direction, whereby the cam member 55 is held at the first position. Then, in accordance with the movement of the disc tray 5 toward the playback position, the protrusion 59 slides from the first movement restricting groove 7*a* to the second movement restricting groove 7*b*, and upon moving through the slanting groove of the second movement restricting groove 7*b*, the cam member 55 is caused to displace within the range of the lower grooves 583 of the cam grooves 58*a*, 58*b* of the cam member 55. Then, when the protrusion 59 reaches the position of the third movement restricting groove 7*c*, the cam member 55 is allowed to move toward the second position.

As shown in FIG. 9 and FIG. 10, the drive mechanism 60 of the loading mechanism 50 comprises a loading motor (DC motor) 61 capable or forward/reverse rotation provided on the underside surface of the front portion of the chassis 40, a pinion gear 62 mounted on a rotation axis 61*a* of the loading motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64*a* being integrally formed on top of this cylindrical portion so as to be coaxially therewith. Meshing with the small gear 64*a* of the third gear 64 is an operative gear 65 which also meshes with the first and second racks 6*a*, 6*b* of the disc tray 5. Namely, the operative gear 65 is constructed from a lower gear 65*a* which meshes with the small gear 64*a* of the third gear 64, and an upper gear 65*b* which meshes with the rack 6 of the disc tray 5, in which the upper gear 65b being integrally formed on the same axis as the lower gear 65a.

In this embodiment, the gears 62–65 are flat teeth gears, and a combination thereof constitutes a rotational speed reduction mechanism for the loading motor 61 in the loading mechanism 50.

The operative gear 65 is rotatablly mounted to a rotation axis 67 provided on a planetary arm 66, and this planetary arm 66 is rotatably mounted to a rotation axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 described above to which the operative gear 65 is rotatably mounteda. Namely, the operative gear 65 rotates about the axis 67 of the first arm 66b which is served as a rotation axis thereof while the operative gear 65 also turns around the axis 64b which is served as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward, and the tip portion of this pin 68 is fitted into an engaging portion 55c formed in the cam member 55.

In this connection, as shown in FIG. 9 and FIG. 10, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the operative gear 65 being held at a prescribed position, and a second operation when engaged with the second rack 6b of the disc tray 5, in which the cam member 55 is moved between the first position and the second position by the movement of the operative gear 65.

Specifically, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engagement portion 55c of the cam member 55, thereby making it impossible for the planetary arm 66 to be turned around the axis 64b. As a result, the operative gear 65 is being held at a prescribed position while the protrusion 59 of the cam member 55 is engaged with the first movement restricting groove 7a of the disc tray 5. In this state, as shown by the dashed line in FIG. 2, the operative gear 65 engages with the first linear rack 6a of the disc tray 5, whereby the disc tray 5 is moved from the disc eject position to the disc loaded position according to the rotation of the operative gear 65 caused by the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced by a small amount. When the disc tray 5 moves further, the protrusion 59 reaches the third movement restricting groove 7c, whereby the cam member 55 is allowed to move from the first position to the second position. In this state, as shown by the dashed line in FIG. 3, since the operative gear 65 is engaged with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61. Namely, the operative gear 65 acts as a planetary gear.

In accordance with such a turning movement of the operative gear 65, the planetary arm 66 rotates clockwise around the common axis (revolution axis) 64b from the position shown in FIG. 9 to the position shown in FIG. 10, which in turn causes the second arm 66c of the planetary arm 66 to rotate in the same direction. In accordance with this rotation of the second arm 66c, the cam member 55 is driven by means of the pin 68 coupled with the engaging portion 55c, and thereby the cam member 55 moves from the first position shown in FIG. 9 toward the second position shown in FIG. 10. In accordance with this movement of the cam member 55 from the first position toward the second position, the front guide pins 430a, 430b of the base frame 43 of the mechanism unit 42 rise up along the slanting grooves 582, 582, whereby the front portion of the mechanism unit 42 is also displaced from the lowered position shown in FIG. 2 to the raised position shown in FIG. 3.

Figure 11:
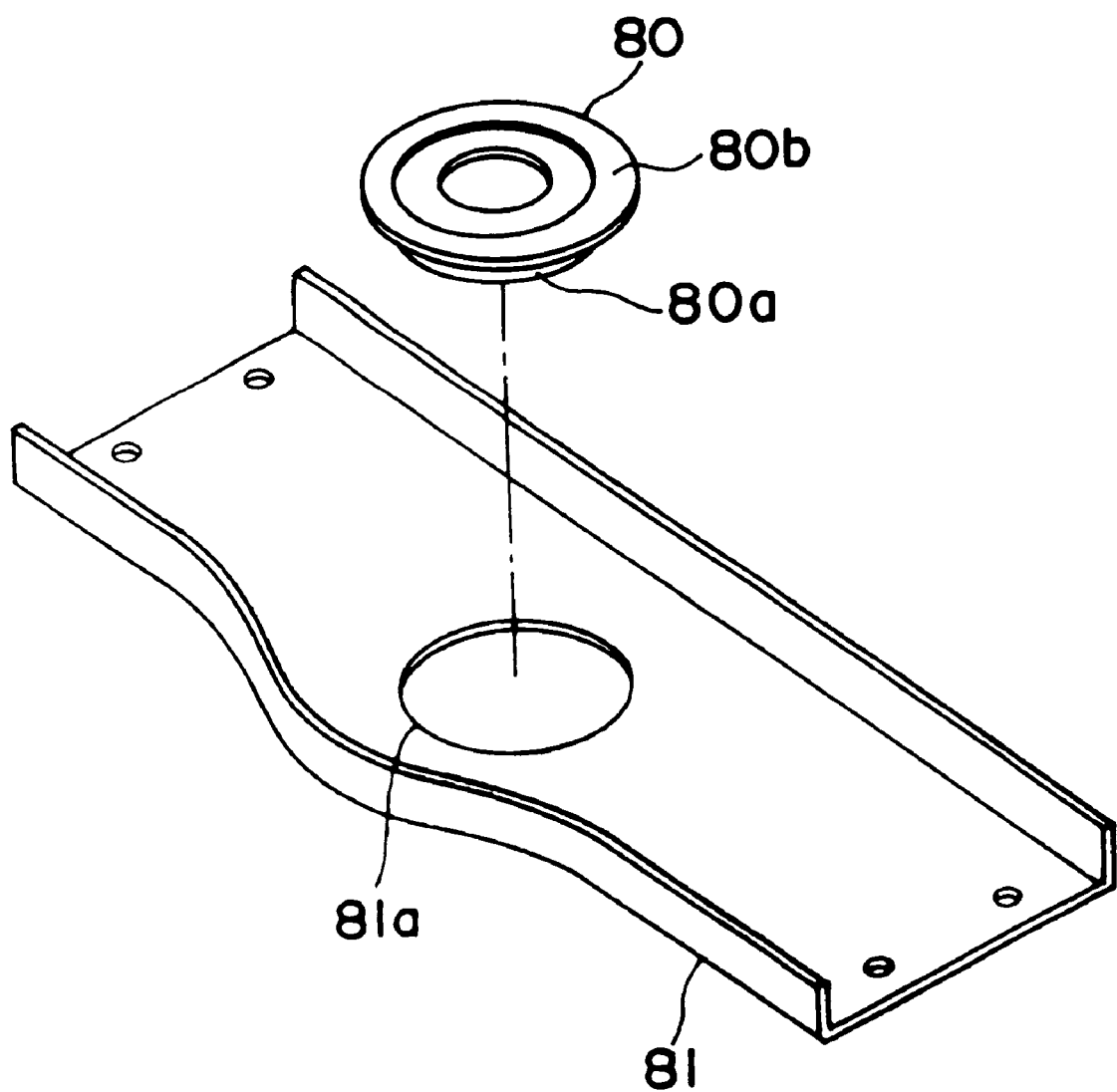
FIG. 11 is a perspective view which shows the structure of a disc clamper used in the disc drive shown in FIG. 1.

Further, a disc damper 80 is provided on the upper portion of the chassis 40. As shown in FIG. 11, the disc damper 80 is rotatably supported by a plate-shaped support member 81 having a central opening 81a.

In more detail, the support member 81 mounted onto the chassis 40 in the side-ways direction by being fastened at both ends with bosses (or rivets) to mounting portions 40c of the chassis 40. On the other hand, the disc clamper 80 is formed from a flat drum-shaped main body 80a having a bottom portion that is to be inserted into the opening 81a of the support member 81, and a flange portion 80b which is formed around the upper circumferential portion of the main body 80a. The flange portion 80b is adapted to abut the top of the support member 81. Further, an annular steel attraction member is provided inside the main body 80a and is adapted to be pulled by the permanent magnet 46b provided in the turntable 46.

Further, indicated by the reference numeral 90 in FIG. 2 and FIG. 3 is an emergency eject mechanism for the disc tray. This emergency eject mechanism is provided for ejecting an optical disc 3 placed on the disc tray in case the loading motor 61 is disabled to operate due to a power outage or the like when the optical disc 3 is being rotated for playback. Namely, in this emergency eject mechanism, a jig is inserted into the main body 2 from the outside to forcedly displace the cam member 55 from the second position to the first position to push out a tip portion of the disc tray 5 from the main body 2, and then the disc tray 5 is manually moved forward to eject the optical disc 3.

Next, a description of the operation of the disc drive 1A will be given below. When the disc drive 1A is not in use, the empty disc tray 5 is housed inside the casing 10 (inside the main body 2), that is the disc tray 5 is in the disc loaded position (disc play back position). In this state, as shown in FIG. 3, the mechanism unit 42 is in the raised position, the cam member 55 is in the second position, and the protrusion 59 of the horizontal portion 55a of the cam member 55 is in the third movement restriction groove 7c. Further, as shown by the dashed lines in FIG. 3, the operative gear 65 of the drive mechanism 60 meshes an end portion of the second rack 6b of the underside surface of the disc tray 5 which is far away from the first rack 6a thereof.

Now, if an eject operation is carried out, the loading motor 61 will rotate in a prescribed direction, whereby the operative gear 65 is caused to rotate through the rotational speed reduction mechanism in the clockwise direction shown in FIG. 3. In this state, the operative gear 65 acts as a planetary gear which can be turned around the revolution axis 64b, and in accordance with this revolution, the operative gear 65 moves along the second rack 6b toward the first rack 6a. In accordance with the revolution of the operative gear 65, the planetary arm 66 rotates in the counterclockwise direction about the revolution axis (common axis) 64b. In accordance with the rotation of the planetary arm 66, the second arm 66c causes the cam member 55 to move, via the pin 68, from the second position shown in FIG. 3 (FIG. 10) to the first position shown in FIG. 2 (FIG. 9), whereby the mechanism unit 42 is also moved from the raised position to the lowered position. In this case, while the cam member 55 is moving from the second position to the first position, the protrusion 59 on top of the horizontal portion 55a of the cam member 55 slides along the third movement restricting groove 7c, and reaches the first movement restricting groove 7a via the second movement restricting groove 7b.

At that point, the operative gear 65 moves from the arc-shaped second rack 6b to the linear first rack 6a, and the protrusion 59 of the cam member 55 also moves from the second movement restricting groove 7b to the first movement restricting groove 7a. When the protrusion 59 of the cam member 55 is moved to the first movement restriction groove 7a, the cam member 55 is restricted from moving in the sideways direction, so that the rotation of the planetary arm 66 is also restricted. In this state, the operative gear 65 acts as a driving gear to drive the disc tray 5 with being held at that position. As a result, as shown by the dashed line in FIG. 2, the operative gear 65 engages with the first rack 6a of the disc tray 5, whereby the disc tray 5 is moved from the loaded position to the eject position according to the rotation of the motor 61. In this state, the mechanism unit 42 has been displaced to the lowered position at a prescribed spacing from the disc clamper 80. Accordingly, the disc clamper 80 and the turntable 46 do not hinder the eject operation of the disc tray 5.

Now, if a loading operation is carried out by placing the optical disc 3 into the disc supporting portion 5a of the disc tray 5 which has been ejected to the outside through the opening 15a of the front panel 15, the loading motor 61 will rotate in the reverse direction (i.e., the direction opposite to the direction described above), thereby causing the operative gear 65 to rotate, via the rotational speed reduction mechanism, in the counterclockwise direction (i.e., reverse direction) shown in FIG. 2. Accordingly, the disc tray 5 moves backward (toward the rear of the disc drive) through the opening 15a to the disc loaded position. In this way, the optical disc 3, which is supported at a prescribed position on the disc tray 5, is also transported to the disc loaded position (disc play back position) inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at that position, so that it acts as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, the protrusion 59 of the cam member 55 has moved to the third movement restriction groove 7c via the second movement restriction groove 7b, thereby enabling the cam member 55 to move from the first position to the second position, which in turn also makes it possible for the planetary arm 66 to rotate. In this state, the operative gear 65 moves from the first rack 6a to the second rack 6b.

In this state, the movement of the disc tray 5 is restricted while the planetary arm 66 is capable of revolution. Therefore, if the operative gear 65 is rotated by the loading motor 61, the operative gear 65 moves and turns along the arc-shaped second rack 6b around the axis 64b. Therefore, in this state, the operative gear 65 acts as a planetary gear.

When the operative gear 65 acts as a planetary gear and moves along the arc-shaped second rack 6b as described above, the planetary arm 66 also rotates in accordance with the movement of the operative gear 65, around the revolution axis (common axis) 64b in the clockwise direction shown in FIG. 2. When the planetary arm 66 rotates in this way, the second arm 66c of the planetary arm 66 also rotates in the same manner in the clockwise direction, thereby causing the cam member 55 to move from the first position to the second position.

In accordance with the movement of the cam member 55, the guide pins 430a, 430b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the center hub 46a of the turntable 46 fits into the central hole 3a of the optical disc 3 placed on the disc tray 5 and has been transported to the disc loaded position. Then, the disc clamper 80 is pulled by the pulling force of the permanent magnet of the turntable 46, and then the optical disc 3 is clamped between the turntable 46 and the disc clamper 80.

In this state, if an operation such as a playback operation is carried out, the spindle motor is operated to rotate the turntable 46 in prescribed speeds, thereby making it possible to playback the optical disc 3 or record information thereto. On the other hand, when playback is finished or when playback is stopped in order to switch to another disc, the eject button is pushed after operation of the playback switch (i.e., an operation to stop playback). When this is done, the operation described above for ejecting the disc tray 5 is carried out to eject the disc tray 5 on which the optical disc 3 is placed, to the outside of the main body 2.

Next, a description will be given for the operation of the optical pick-up moving mechanism 48 which utilizes the sled motor mounting structure and the slide mechanism provided with the sled motor mounting structure of the present invention.

First, when the sled motor 480 is driven to move the optical pick-up 47, the lead screw 481 is rotated in accordance with the rotation of the rotation shaft 480*a*. In this case, as was mentioned above, since the rotation shaft 480*a* is being slightly oscillated by applying a pulse voltage at approximately 40 Hz to the coil of the sled motor 480, this makes it possible to smoothly start the motor without having to apply a large voltage.

When the lead screw 481 is rotated in the advancing direction (in the A direction in FIG. 7A, which enables the rotation shaft 480*a* to move in the tip direction), the rotation shaft 480*a* moves in the tip direction in accordance with such rotation, whereby the rotation shaft 480*a* abuts the stopper plate 487 when it is displaced only a distance d, and is thereby restricted from further movement. In this way, it is possible to prevent the collar and thrust washer inside the motor from coming into contact with the motor bearing, and this In turn makes it possible to prevent the rotation load of the motor from increasing.

Further, because there is no resistance exerted on the rotation shaft 480*a* by a plate spring or the like which is used in the prior art to push a rotation shaft 480*a* toward the base end, it is possible to smoothly rotate the sled motor 480 without the need for a large torque. Consequently, it is possible to smoothly operate the optical pick-up moving mechanism. In this way, it becomes possible to accurately hold the objective lens of the optical pick-up at the center of the actuator when the optical pick-up moving mechanism is operated, whereby it becomes possible to prevent the writing characteristics of a CD-R drive from being degraded.

Further, because there-is no need for a large torque to rotate the sled motor, it is possible to use a small size motor, this resulting in reduced power consumption. Further, use of the small size motor realizes effective utilization of the space inside the disc drive, and this also makes it possible to design miniaturized disc drives.

Figure 7A:
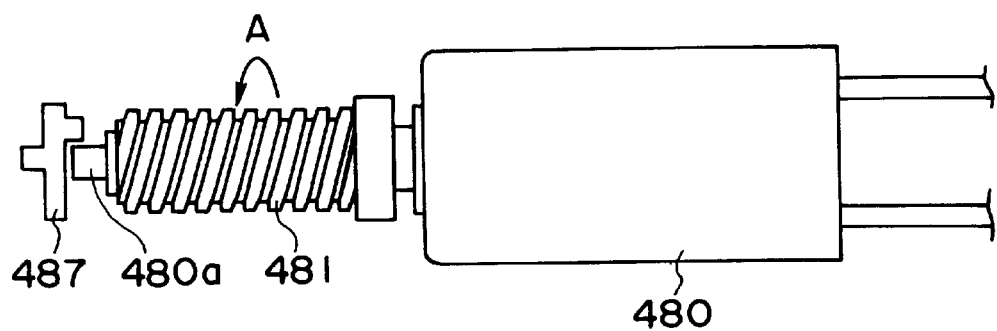
FIG. 7A is a planner view which shows a sled motor used in the disc drive shown in FIG. 1.
Figure 7B:
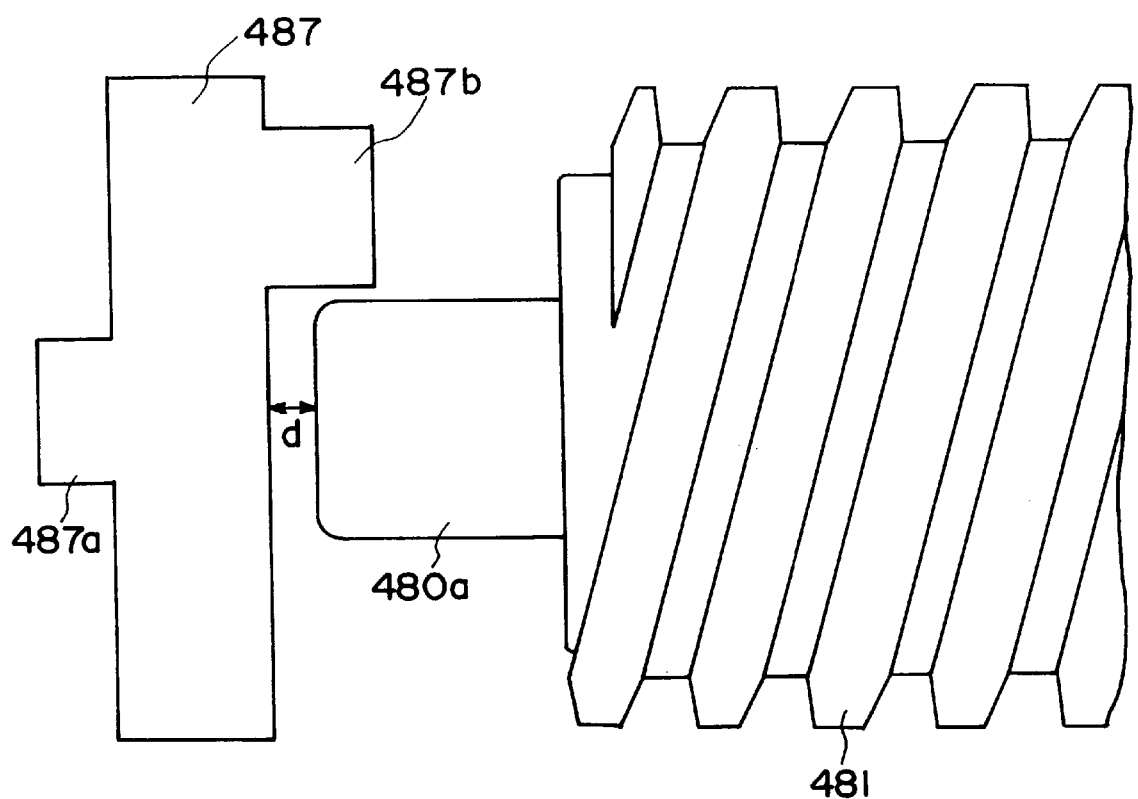
FIG. 7B is an enlarged view which shows the gap between the tip of the rotation axis of the sled motor and a stopper member.

When the lead screw 481 is rotated in the direction indicated by the arrow A in FIG. 7A by driving the sled motor 480 in the manner mentioned above, such rotation is transmitted in a reduced state via the worm wheel 482*a* and the pinion gear 482*b* of the reduction gear 482 and the rack gear 483, whereby the slider 484 is moved along the guide rod 485 in a direction toward the turntable 46. On the other hand, when the lead screw 481 is rotated in a direction opposite that of the arrow A shown in FIG. 7A by the reverse rotation of the motor, this causes the slider 484 to move in a direction away from the turntable 46. In this way, the optical pick-up 47 fixed to the head support platform 486 moves along an axial direction of the optical disc 3 loaded on the disc tray 5.

Now, even though the sled motor mounting structure and the sliding feed mechanism provided with the sled motor mounting structure of the present invention were described above with reference to the embodiments shown in the drawings, the present invention is not limited to such embodiments, and instead it is possible to make various changes and additions. Further, the present invention is not limited to a CD-R drive, and instead it is of course possible to apply the present invention to other types of disc drives, such as a CD-ROM drive and the like. Further, the present invention is not limited to disc drives, and instead it is possible to apply the present invention to devices other than disc drives that use a sliding feed mechanism provided with a sled motor or the like.

What is claimed is:

1. A sled motor mounting structure comprising:
   a sled motor having a rotation shaft with a tip and a lead screw which is mounted on the rotation shaft and is in mesh with a mated gear, the rotation shaft having a play in its axial direction for enabling a smooth rotation, wherein the rotation shaft is displaceable within the play between a first position where the tip of the rotation shaft is positioned closest to the sled motor and a second position where the tip of the rotation shaft is positioned farthest from the sled motor according to the rotation of the lead screw; and
   an inelastic stopper having an abutment surface and provided in front of the tip of the rotation shaft of the sled motor such that the tip of the rotation shaft comes to abut the abutment surface when the rotation shaft is displaced toward the second position due to the rotation of the lead screw which is in mesh with the mated gear wherein the stopper is arranged in front of the tip of the rotation shaft such that the abutment surface of the stopper is a predetermined distance from the tip of the rotation shaft when the tip is positioned at the first position, and further wherein the predetermined distance is smaller than the length of the play in the axial direction of the rotation shaft so that the tip of the rotation shaft is restricted from further movement in the axial direction of the rotation shaft.

2. The sled motor mounting structure as claimed in claim 1 wherein the predetermined distance lies within the range of 0.02 mm–0.05 mm.

3. The sled motor mounting structure as claimed in claim 1 wherein the stopper further includes a reinforcing means.

4. A sliding feed mechanism comprising:
   a sled motor having a rotation shaft with a tip and a lead screw mounted on the rotation shaft, the rotation shaft having a play in its axial direction for enabling a smooth rotation, wherein the rotation shaft is displaceable within the play between a first position where the tip of the rotation shaft is positioned closest to the sled motor and a second position where the tip of the rotation shaft is positioned farthest from the sled motor according to the rotation of the lead screw;
   a speed reduction gear mechanism which includes a mated gear in mesh with the lead screw;
   a driven means which is driven through the speed reduction gear mechanism; and
   an inelastic stopper having an abutment surface wherein the stopper is provided in front of the tip of the rotation shaft of the sled motor such that the tip of the rotation shaft comes to abut the abutment surface when the rotation shaft is displaced toward the second position due to the rotation of the lead screw which is in mesh with the mated gear, wherein the stopper is arranged in front of the tip of the rotation shaft such that the abutment surface of the stopper is a predetermined distance from the tip of the rotation shaft when the tip is positioned at the first position, and further wherein the predetermined distance is smaller than the length of play in the axial direction of the rotation shaft so that the tip of the rotation shaft is restricted from further movement in the axial direction of the rotation shaft.

5. The sliding feed mechanism as claimed in claim 4 wherein the predetermined distance lies within the range of 0.02 mm–0.05 mm.

6. The sliding feed mechanism as claimed in claim 4 wherein the stopper further includes a reinforcing means.

* * * * *

UNITED STATES PATENT AND TRADEMARK OFFICE
CERTIFICATE OF CORRECTION

PATENT NO.    : 6,205,109 B1
DATED         : March 20, 2001
INVENTOR(S)   : Ken'ichi Furukawa, Kouji Teranishi, Satoru Manabe Page 1 of 1

It is certified that error appears in the above-identified patent and that said Letters Patent is hereby corrected as shown below:

Column 3,
Line 55, remove period (.) following "not"

Column 4,
Line 27, change "Sa" to -- 5a --
Line 55, change "disk" to read -- disc --
Lines 60 and 63, "45" should not be BOLDFACE
Line 65, "90" should not be BOLDFACE Column 5,
Line 49, "fram3" should read -- frame --

Column 7,
Line 2, change "bemovedupanddown" to read -- be moved up and down --
Line 3, change "Furthermore,aring-shapedperm-anentmagnet" to read -- Furthermore, a ring-shaped permanent magnet --

Column 9,
Line 5, remove hyphen (-) after "interval."

Column 11,
Line 18, change "mounteda" to read -- mounted --

Column 12,
Line 32, change "grooves 582, 582," to read -- grooves 582, --

Signed and Sealed this

Fifth Day of March, 2002

*Attest:*

*Attesting Officer*

JAMES E. ROGAN
*Director of the United States Patent and Trademark Office*